US011092683B2

(12) United States Patent
Wu

(10) Patent No.: US 11,092,683 B2
(45) Date of Patent: Aug. 17, 2021

(54) DISTRIBUTED APERTURE AUTOMOTIVE RADAR SYSTEM WITH ALTERNATING MASTER RADAR DEVICES

(71) Applicant: NXP USA, Inc., Austin, TX (US)

(72) Inventor: Ryan H. Wu, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 336 days.

(21) Appl. No.: 16/356,776

(22) Filed: Mar. 18, 2019

(65) Prior Publication Data

US 2020/0300995 A1 Sep. 24, 2020

(51) Int. Cl.
| G01S 13/00 | (2006.01) |
| G01S 7/35 | (2006.01) |
| G01S 7/41 | (2006.01) |
| G01S 13/04 | (2006.01) |
| G01S 13/42 | (2006.01) |
| G01S 13/87 | (2006.01) |

(52) U.S. Cl.
CPC ............ *G01S 13/003* (2013.01); *G01S 7/352* (2013.01); *G01S 7/41* (2013.01); *G01S 13/04* (2013.01); *G01S 13/42* (2013.01); *G01S 13/878* (2013.01)

(58) Field of Classification Search
CPC .... G01S 13/931; G01S 13/003; G01S 13/584; G01S 13/878; G01S 13/42; G01S 13/87; G01S 2007/356; G01S 7/03; G01S 7/352; G01S 13/04; G01S 7/032; G01S 7/282; G01S 7/288; G01S 13/88; G01S 13/34
See application file for complete search history.

(56) References Cited

U.S. PATENT DOCUMENTS

| 3,487,462 A | 12/1969 | Holberg |
| 3,812,493 A | 5/1974 | Afendykiw et al. |
| 4,994,809 A | 2/1991 | Yung et al. |

(Continued)

FOREIGN PATENT DOCUMENTS

| EP | 3136122 A1 | 3/2017 |
| WO | PCT-2018/115370 A1 | 6/2018 |
| WO | WO2020158009 A1 | 8/2020 |

OTHER PUBLICATIONS

Raza, Ahsan et al., "Thinned Coprime Array for Second-Order Difference Co-Array Generation With Reduced Mutual Coupling", IEEE Transactions on Signal Processing, Apr. 15, 2019, pp. 2052-2065, vol. 67, No. 8, IEEE, Piscataway, NJ, USA.

(Continued)

*Primary Examiner* — Olumide Ajibade Akonai

(57) ABSTRACT

A distributed aperture bi-static radar system, apparatus, architecture, and method is provided for coherently combining physically distributed radars to jointly produce target scene information in a coherent fashion by alternately selecting first and second small aperture devices to operate as the master unit so that radar signals are sequentially transmitted from every transmit antenna in the first and second small aperture devices, thereby enabling the radar control processing unit to coherently combine mono-static and bi-static virtual array apertures from the first and second small aperture radar devices to construct an extended bi-static MIMO virtual army aperture that is larger than the bi-static MIMO virtual array apertures produced by the first and second small aperture radar devices.

20 Claims, 5 Drawing Sheets

(56) References Cited

U.S. PATENT DOCUMENTS

| | | | |
|---|---|---|---|
| 9,638,793 B2* | 5/2017 | Wang | G01S 13/288 |
| 10,509,104 B1* | 12/2019 | Dato | G01S 7/032 |
| 10,641,881 B2* | 5/2020 | Searcy | G01S 7/032 |
| 2009/0262004 A1* | 10/2009 | Wen | H04W 16/14 342/20 |
| 2014/0111372 A1 | 4/2014 | Wu | |
| 2016/0018511 A1 | 1/2016 | Nayyar et al. | |
| 2016/0077196 A1 | 3/2016 | Dehlink et al. | |
| 2016/0103206 A1 | 4/2016 | Pavao-Moreira et al. | |
| 2016/0109559 A1 | 4/2016 | Delbecq et al. | |
| 2016/0124086 A1 | 5/2016 | Jansen et al. | |
| 2016/0131752 A1 | 5/2016 | Jansen et al. | |
| 2016/0146931 A1 | 5/2016 | Rao et al. | |
| 2016/0157828 A1 | 6/2016 | Sumi et al. | |
| 2016/0223643 A1 | 8/2016 | Li et al. | |
| 2016/0266239 A1 | 9/2016 | Pavao-Moreira et al. | |
| 2017/0315221 A1 | 11/2017 | Cohen et al. | |
| 2018/0088221 A1* | 3/2018 | Yomo | G01S 13/878 |
| 2018/0115409 A1* | 4/2018 | Nayyar | G01S 13/343 |
| 2018/0128910 A1 | 5/2018 | Lee | |
| 2018/0210067 A1 | 7/2018 | Bilik et al. | |
| 2019/0041494 A1 | 2/2019 | Roger et al. | |
| 2020/0284877 A1* | 9/2020 | Ahmed | G01S 13/32 |
| 2021/0011121 A1 | 1/2021 | Arbabian et al. | |
| 2021/0156981 A1 | 5/2021 | Stettiner et al. | |

OTHER PUBLICATIONS

Yang, Yang et al., "Some Phase Synchronisation Algorithms for Coherent MIMO Radar", 45th Annual Conference on Information Sciences and Systems, Mar. 23, 2011, pp. 1-6, IEEE, Piscataway, NJ, USA.

Shun-Lin Liu, Sparse Array Signal Processing: New Array Geometries, Parameter Estimation, and Theoretical Analysis, Thesis, Caltech, 2018.

Zhe Wang et al., Nested Array Sensor With Grating Lobe Suppression and Arbitrary Transmit-Receive Beampattern Synthesis, IEEE Access, published Feb. 9, 2018.

Paul Swirhun, Millimeter-Wave Circuit Design for Radar Transceivers, Technical Report No. UCB/EECS-2013-192, Dec. 1, 2013, https://www2.eecs.berkeley.edu/Pubs/TechRpts/2013/EECS-2013-192.pdf.

NXP, Analog, Mixed Signal and Power Management, MR2001-77 GHZ Radar Transceiver Chipset, 2015.

Jasbir Singh et al., Texas Instruments, AWR1642 mmWave sensor: 76-81-GHz radar-on-chip for short-range radar applications, 2017, http://www.ti.com/lit/wp/spyy006/spyy006.pdf.

Florian Starzer et al., A Novel 77-GHz Radar Frontend with 19-GHz Signal Distribution on RF-PCB Substrate, 2010 Topical Meeting on Silicon Monolithic Integrated Circuits in RF0 Systems (SiRF), Jan. 11-13, 2010, https://ieeexplore.ieee.org/stamp/stamp.jsp?tp=8<arnumber=5422941.

Anil Kumar K V et al., Texas Instruments, Application Report, SWRA574A—Oct. 2017, revised Dec. 2017, AWR1243 Cascade,http://www.tij.co.jp/jp/lit/an/swra574a/swra574a.pdf.

R. Feger et al., A 77-GHz FMCW MIMO Radar Based on Loosely Coupled Stations, The 7th German Microwave Conference, Mar. 12-14, 2012, https://ieeexplore.ieee.org/document/6185182/.

Alexander Ganis et al., A portable 3D Imaging FMCW MIMO Radar Demonstrator with a 24×24 Antenna Array for Medium Range Applications, IEEE Transactions on Geoscience and Remote Sensing, vol. 56, Issue:1, Jan. 2018), pp. 298-312, Sep. 22, 2017.

* cited by examiner

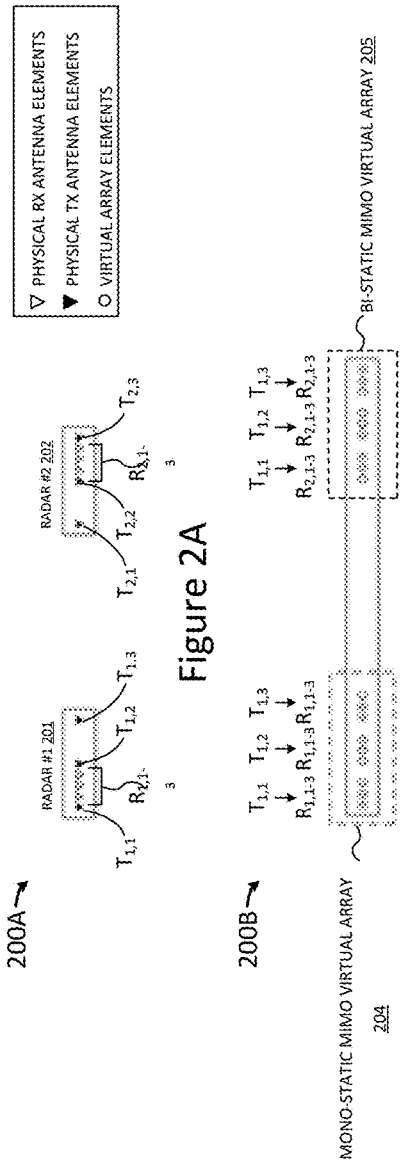
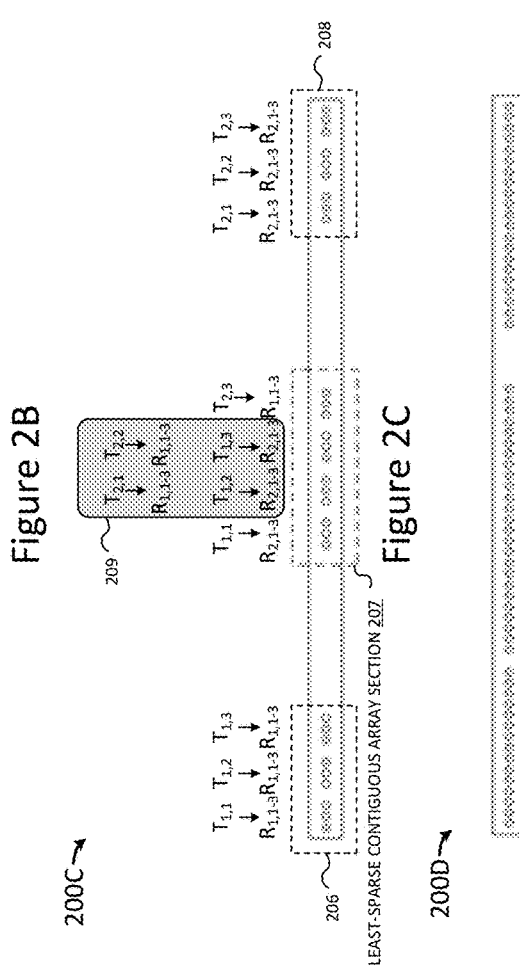

DISTRIBUTED APERTURE AUTOMOTIVE RADAR SYSTEM WITH ALTERNATING MASTER RADAR DEVICES

BACKGROUND OF THE INVENTION

Cross-reference to Related Applications

U.S. patent application Ser. No. 16,356,764, entitled "Distributed Aperture Automotive Radar System," by inventors Ryan H. Wu and Arunesh Roy, filed on even date herewith, describes exemplary methods and systems and is incorporated by reference in its entirety.

U.S. patent application Ser. No. 16,356,792, entitled "High Resolution Automotive Radar System with Forward and Backward Difference Co-Array Processing," by inventor Ryan H. Wu, filed on even date herewith, describes exemplary methods and systems and is incorporated by reference in its entirety.

FIELD OF THE INVENTION

The present invention is directed in general to radar systems and associated methods of operation. In one aspect, the present invention relates to an automotive radar system formed with independent distributed radars.

DESCRIPTION OF THE RELATED ART

Radar systems may be used to detect the range and velocity of nearby targets. With advances in technology, radar systems may now be applied in many different applications, such as automotive radar safety systems, but not every radar system is suitable for every application. For example, 77 GHz Frequency Modulation Continuous Wave (FMCW) Fast Chirp Modulation (FCM) radars are used as primary sensors in Advanced Driver Assistance System (ADAS) and are used as safety sensors in autonomous driving (AD) systems, but are not used as the primary sensor in AD systems due to limited angular resolution performance. To enable the use of such radar systems as the primary sensor for driver replacement in AD systems, such systems must provide better angular resolution, but this typically requires larger antenna apertures, and therefore physically larger radars. Unfortunately, the requirement of having larger radars can conflict with other design and/or operational constraints, such as integrating a large aperture radar into a vehicle which has competing requirements for design, structure, and/or operation. For example, the front of a vehicle may have design or structural elements (e.g., headlights, design emblems, bumpers, etc.) that do not readily admit the addition of a large aperture radar. Keeping the size of radar sufficiently small so it can be integrated with other parts of the vehicle implies that the aperture of the radar is constrained and thus the angular resolution is limited.

Existing radar systems have attempted to address these challenges by using techniques (e.g., bistatic multiple-input multiple-output radar) which effectively combine a plurality of distributed, smaller aperture radars to form a larger virtual aperture. However, these techniques typically require that the distributed radars share a common reference local oscillator (LO) signal (so the radars operate on the same frequency and time reference) and/or require complex and expensive modifications to hardware and software to cross-correlate or mix target return signals with the signals from other transmitters. Unfortunately, these requirements may not be possible due to car integration, complexity, and/or cost constraints which prevent such solutions from being robustly and economically implemented. As seen from the foregoing, the existing radar system solutions are extremely difficult at a practical level by virtue of the challenges with achieving the performance benefits of larger size radars within the performance, design, complexity and cost constraints of existing radar system applications.

BRIEF DESCRIPTION OF THE DRAWINGS

The present invention may be understood, and its numerous objects, features and advantages obtained, when the following detailed description of a preferred embodiment is considered in conjunction with the following drawings.

FIGS. 2A-E are simplified diagrammatic depictions of the physical radar apertures and MIMO virtual array apertures provided by two distributed radars in accordance with selected embodiments of the present disclosure.

DETAILED DESCRIPTION

Figure 1:
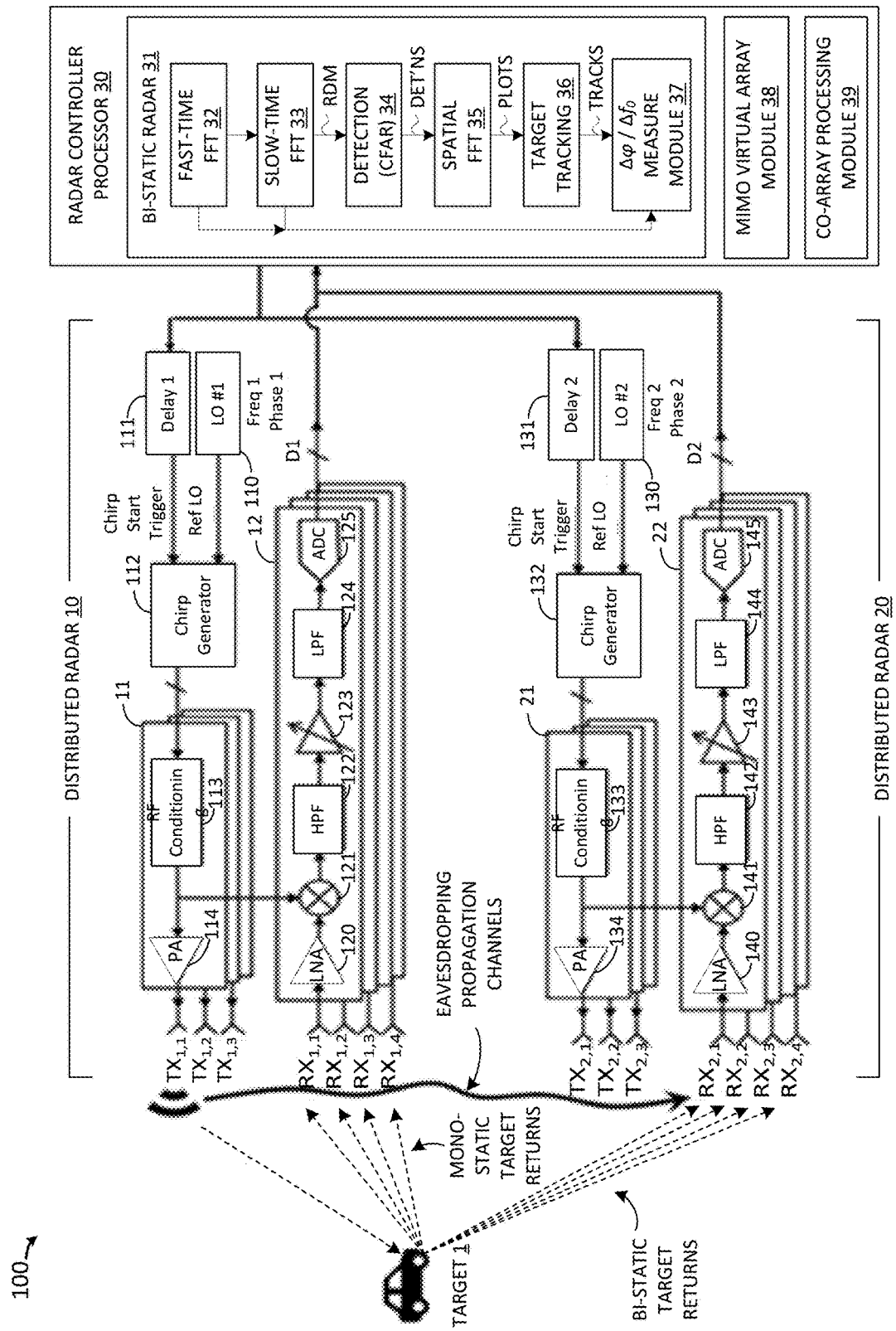
FIG. 1 is a simplified schematic diagram of a distributed coherent radar system in accordance with selected embodiments of the present disclosure.

A distributed aperture radar system, hardware circuit, system, architecture, and methodology are described for jointly producing target scene information with multiple coherent radars that do not require a shared common local oscillator reference. In selected embodiments, a signal processing methodology and algorithm are disclosed for controlling a plurality of physically distributed, small aperture radars in a bi-static or multi-static radar transceiver to determine the frequency offset $\Delta f_o$ and phase offset $\Delta\varphi$ between master and slave radars, thereby avoiding the requirement(s) of a shared/common LO signal and/or physically mixing or correlating the received other transmitters' transmissions with received target returns. In other embodiments, a distributed aperture, bi-static radar system is disclosed for constructing an extended multiple-input-multiple-output (MIMO) aperture by alternating the role of the master transmitting radar among radars, thereby providing a bi-static MIMO aperture that is larger than the combined physical size of the distributed apertures for greatly improved angular resolution performance. In yet other embodiments, a signal processing methodology and algorithm are disclosed for constructing and accumulating mono-static and bi-static MIMO virtual array outputs and then performing forward and backward difference co-array processing and construction for cascaded physical and virtual array processing to mitigate or suppress spurious sidelobes in the formed radar beam pattern. By providing hardware and software solutions for combining independent distributed radars that are offset in both frequency and phase, the disclosed distributed aperture radar system and methodology efficiently provide a coherent bi-static MIMO virtual array having an aperture that is many times larger than the total physical apertures combined, thereby achieving better sensitivity, finer angular resolution, and low false detection rate. And by using the disclosed forward and backward single-frame difference co-array beamforming signal processing techniques, sparse apertures may be filled with virtual elements, resulting in very fine angular resolution while suppressing false detections due to spurious sidelobes.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, the radar systems are used to measure the radial distance to a reflecting object and its relative radial velocity, and are characterized by performance criteria, such as the angular resolution (the minimum distance between two equal large targets at the same range and range rate (or radial velocity) resolution cell which a radar is able to distinguish and separate to each other), sensitivity, false detection rate, and the like. Typically, frequency modulated continuous wave (FMCW) modulation techniques are used to identify the distance and/or velocity of a radar target, such as a car or pedestrian, by transmitting FMCW modulated signals from multiple transmit antennas so that reflected signals from the radar target are received at multiple receive antennas and processed to determine the radial distance and relative radial velocity and direction for the radar target. However, with current automotive designs, a vehicle can include multiple radars which operate independently from one another. Typically, one radar's transmissions are not used by any other radars, and are instead treated as interferences which need to be avoided or suppressed to prevent interference. Alternatively, the outputs from individual radars are used independently or integrated in a non-coherent fashion or fused by the tracker. Techniques for non-coherently combining multiple front-end system-on-chip devices are known in literature; see for example the following references: P. Swirhun, "Millimeter-Wave Circuit Design for Radar Transceivers (2013); NXP Fact Sheet entitled "MR2001: 77 GHZ Radar Transceiver Chipset" (2015); and Texas Instruments publication entitled "AWR1642 mmWave sensor: 76-81-GHz radar-on-chip for short-range radar applications" (2017). However, non-coherent integration or track fusion does not increase the system angular performance.

And while there are systems which combine distributed apertures to form a larger aperture, such systems typically require that the distributed radars share a common reference local oscillator (LO) signal so the radars operate on the same frequency and time reference. The common reference LO signal is usually shared via physical wave-guide connections (e.g., PCB transmission lines, substrate integrated waveguides, coaxial cables, etc.) or even wireless connections that have precisely measured phase delays within the frequency range of operation. Techniques for combining multiple front-end system-on-chip devices with a shared, distributed LO signal are known in literature; see for example the following references: F. Starzer et al., "A Novel 77-GHz Radar Frontend with 19-GHz Signal Distribution on RF-PCB Substrate," 2010 Topical Meeting on Silicon Monolithic Integrated Circuits in RF Systems (SiRF), pp. 152-155 (2010); U.S. Patent Pub'n. No. 2016/0018511AI to J. Nayyar et al. entitled "Distributed Radar Signal Processing in a Radar System"; and "Texas Instruments Application Report, AWR1243 Cascade" (October 2017, revised December 2017). However, there are often situations where car integration constraints prevent such connections from being robustly and economically implemented.

As an alternative to physically sharing the LO signal, distributed apertures can also be combined in systems, such as bi-static radar systems, that form a single large aperture by having each radar receive the other radars' transmissions and then cross-correlate the target returns with the received transmissions from the other radars for estimating target parameters. Multi-static radar techniques are known in literature, see for example the following references: U.S. Pat. No. 3,487,462 to D. Holberg entitled "Bistatic radar configuration not requiring reference-data transmission"; U.S. Pat. No. 3,812,493 to M. Afendykiw et al. entitled "Bistatic passive radar"; and U.S. Pat. No. 4,994,809 to K. Tung et al. entitled "Polystatic correlating radar." Such approaches, however, require relatively complex and expensive modifications to existing automotive radar transceiver hardware and software because of the lack of the dedicated cross-correlator circuitry for the reference signal.

To address these limitations from conventional solutions and others known to those skilled in the art, reference is now made to FIG. 1 which depicts a simplified schematic diagram of a distributed coherent radar system 100 which includes two or more distributed radar devices 10, 20 connected to a radar controller processor 30. In selected embodiments, each of the distributed radar devices 10, 20 may be embodied as a line-replaceable unit (LRU) or modular component that is designed to be replaced quickly at an operating location. Similarly, the radar controller processor 30 may be embodied as a line-replaceable unit (LRU) or modular component. Although two distributed radar devices 10, 20 are shown, it will be appreciated that additional distributed radar devices may be used. In addition, the depicted radar system 100 may be implemented in integrated circuit form with the distributed radar devices 10, 20 and the radar controller processor 30 formed with separate integrated circuits (chips) or with a single chip, depending on the application.

Each distributed radar device 10, 20 includes one or more transmitting antenna elements $TX_i$ and receiving antenna elements RX connected, respectively, to one or more radio-frequency (RF) transmitter (TX) units 11, 21 and receiver (RX) units 12, 22. For example, each radar device (e.g., 10) is shown as including individual antenna elements (e.g., $TX_{1,i}$, $RX_{1,j}$) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12. Each radar device 10, 20 also includes a chirp generator 112, 132 which is configured and connected to supply a chirp input signal to the transmitter modules 11, 21. To this end, the chirp generator 112, 132 is connected to receive a separate and independent local oscillator (LO) signal generator 110, 130 so that the distributed radars 10, 20 do not share a common local oscillator (LO) signal, but are instead operated in a coordinated but non-coherent fashion as disclosed herein. In addition, a common chirp start trigger signal may be shared amongst the chirp generators 112, 132, though delays are likely to be different due to the signal path differences and programmable digital delay elements 111, 131. As a result, the transmitter elements 11, 12 operate in a non-coherent fashion because, even though they are programmed to transmit identical waveforms and share a common schedule, the generated waveforms are likely to have distinct starting frequencies, phases, and transmitting time.

The radar system 100 also includes a radar controller processing unit 30 that is connected to supply input control signals to the distributed radar devices 10, 20 and to receive therefrom digital output signals generated by the receiver modules 12, 22. In selected embodiments, the radar controller processing unit 30 may be embodied as a micro-controller unit (MCU) or other processing unit that is configured and arranged for signal processing tasks such as, but not limited to, target identification, computation of target distance, target velocity, and target direction, and generating control signals. The radar controller processing unit 30 may, for example, be configured to generate calibration signals, receive data signals, receive sensor signals, generate frequency spectrum shaping signals (such as ramp generation in the case of FMCW radar) and/or state machine signals for RF (radio frequency) circuit enablement sequences. In addition, the radar controller processor 30 may be configured to program the modules (s) 11, 21 to operate in a coordinated fashion by transmitting MIMO waveforms for use in constructing a virtual aperture from a combination of the distributed apertures formed by the distributed transmitting and receiving antenna elements $TX_i$, $RX_j$.

In the example shown, each chirp generator 112, 132 generates a chirp signal in response to a chirp start trigger signal generated by the delay circuit 111, 131, and a corresponding reference local oscillator signal LO #1, LO #2 generated by frequency synthesizer unit 10, 130. Since the reference LO signals are independent, they may have different frequency and phase values, which in turn affects the frequency and phase of the generated chirp signal. The resulting chirp signal from each generator 112, 132 is then processed by the RF conditioning unit 113, 133 and amplified at the power amplifier (PA) 114, 134 which amplifies the signal to a level suitable for transmission as a radar signal by a transmitter antenna unit $TX_{1,j}$, $TX_{2,i}$. Though not shown, it will be understood that the transmitter module 11, 21 may include additional processing circuits, such as a digital-to-analog converter (DAC), phase shifter (or phase rotator), buffer, mixer, filter, and the like.

The radar signal transmitted by the transmitter antenna unit $TX_{1,j}$, $TX_{2,j}$ may by reflected by an object, such as a vehicle 1. Part of the reflected radar signal (e.g., mono-static target returns) reaches receiver antenna units $RX_{1,j}$ at the first distributed radar device 10, and another part (e.g., bi-static target returns) reaches receiver antenna units $RX_{2,j}$ at the second distributed radar device 20. At each receiver module 12, 22, the received (radio frequency) antenna signal is amplified by a low noise amplifier (LNA) 120, 140 and then fed to a mixer 121, 141 where it is mixed with the RF conditioned signal generated by the RF conditioning unit 113, 133. The resulting intermediate frequency signal is fed to a first high-pass filter (HPF) 122, 142. The resulting filtered signal is fed to a first variable gain amplifier 123, 143 which amplifies the signal before feeding it to a first low pass filter (LPF) 124, 144. This re-filtered signal is fed to an analog/digital converter (ADC) 125, 145 and is output by each receiver module 12, 22 as a digital signal D1, D2, etc.

In order for each receiver module 11, 21 to be able to distinguish transmitted radar signals from reflected radar signals, the transmitted radar signals may be coded so they can be separated at the receiver modules 12, 22. Such separability can be achieved with code-division multiple access (CDMA), frequency-division multiple access (FDMA), or time-division multiple access (TDMA) techniques. For example, the transmitter antenna units $TX_i$ on each distributed radar device (e.g., 10) may be controlled and configured to transmit one at a time to form a Time-Division MIMO aperture. In another example, each transmitter antenna unit $TX_i$ may be controlled and configured to transmit with an amount of frequency shift for forming Doppler-Division (DD) or Frequency-Division (FD) MIMO apertures. In yet another example, each transmitter antenna units $TX_i$ may be controlled and configured to transmit all at once, but with chirps coded with pseudo-random sequences that are orthogonal across transmitters for forming Code-Division (CD) MIMO apertures.

Under control of the radar controller processor 30, the distributed coherent radar system 100 is configured to operationally combine multiple, physically separated small-aperture radars 10, 20 to function as a single large coherent aperture radar. To this end, the radar controller processor 30 may be configured with a bi-static radar module 31 which is operative to combine the distributed aperture signal results without requiring physically mixing or correlating received target returns with the signals received from other transmitters. However, to achieve this result, the differences in the starting frequency and phase for the reference LO signals must be determined before the system can function as a single radar by coordinating the distributed radar devices 10, 20 to operate in a coherent fashion. Accordingly, the bi-static radar module 31 includes a frequency/phase measurement module 37 that produces frequency offset measurements ($\Delta f_0$) and phase offset measurements ($\Delta \varphi$). By using the frequency/phase measurement module 37 to compute or measure the frequency and phase offsets between the distributed radars 10, 20, one may compensate for the differences and the different radar signals may then be processed in a coherent fashion as if it is a single radar. Note that the time offsets ($\Delta t_0$) amongst distributed radars are assumed to be known which is measured at the time of factory installation and system integration and testing.

In addition to the bi-static radar aperture construction, the radar controller processor 30 may be configured to construct and accumulate multiple-input-multiple-output (MIMO) array outputs to form a MIMO aperture. To this end, the radar controller processor 30 may be configured with a MIMO virtual array module 38 which is operative to alternate the transmitting "master" role among the distributed radar devices 10, 20 so that an extended MIMO aperture can be formed based on MIMO radar principles. In operation, the MIMO virtual array module 38 sequentially selects each of the distributed radar devices 10, 20 to serve as the "master" radar while the remaining radar devices operate as "slave" radar(s) until all of the distributed radar devices 10, 20 have been selected as the master unit once. The selected master-unit radar device transmits radar waveforms and the slave-unit radar device(s) directionally receive and process the master radar's transmitted waveforms using identical range and Doppler processing steps for normal radar waveforms. Applying the estimated frequency and phase offsets ($\Delta f_0$, $\Delta \varphi$) computed by the frequency/phase measurement module 37, each slave radar produces coherent target measurements which the radar controller processor 30 uses to construct and accumulate mono-static and bi-static MIMO array outputs. The resulting bi-static MIMO aperture is even larger than the combined physical size of the distributed apertures, which results in greatly improved angular resolution performance. If there are multiple sections of the resulting MIMO array, the MIMO virtual array module 38 may be configured to identify and select the least-sparse section of the MIMO array to compute a first set of beamforming outputs.

As will be appreciated, the spacing and arrangement of the transmitting and receiving antenna elements $TX_i$, $RX_j$ may result in the construction of a sparse bi-static MIMO array (e.g., contains holes or gaps), resulting in high grating lobes in the formed radar beam pattern. To address the potential grating or spurious lobe issues of sparse arrays, the radar controller processor 30 may be configured with a co-array processing module 39 which is operative to perform forward and backward difference co-array processing and cascaded physical and visual array processing as a mitigation technique for suppressing the spurious sidelobes. In operation, the radar controller processor 30 uses the co-array processing module 39 to construct forward and backward difference co-array outputs based on the MIMO array outputs. If the formed difference co-array is uniformly spaced, the radar controller processor 30 may perform spatial smoothing on the difference co-array outputs. In addition or in the alternative, the radar controller processor 30 may be configured to compute a second beamforming output based on the (spatially-smoothed) co-array outputs, and then compute a composite beamforming output based on the first and the second beamforming outputs. Based on this processing, the radar controller processor 30 may then generate and output the target Range-Doppler-Angle map data.

Frequency/Phase Measurement

As indicated above, selected embodiments of the present disclosure provide a method and apparatus for determining or measuring frequency and phase differences between the distributed radar devices 10, 20 for use in constructing a large, coherent virtual aperture radar from multiple physically separated or distributed small-aperture radars by compensating the distributed radars' radar measurements for processing in a coherent fashion. In the depicted distributed coherent radar system 100, this is illustrated with the example of a radar controller processor 30 which coordinates the coherent operation of two distributed radar devices 10, 20, each consisting of three transmit channels, four receiving channels, and an independent reference LO generator.

For illustration purposes, the first radar device 10 is selected as the master unit to implement a time-division MIMO process wherein a first transmit antenna ($TX_{1,1}$) is radiating while the rest of the transmit antennas ($TX_{1,2}$, $TX_{1,3}$) are not radiating. By design, the second radar device 20 eavesdrops on the transmit signal from the first transmit antenna $TX_{1,1}$ to receive the transmit signal and perform fast-time and slow-time processing on the received signal in the same way the second radar device 20 processes its own target returns. In FIG. 1, this is shown with the second radar device which receives the eavesdropping propagation channel(s) at one or more of the receive antennas ($RX_{2,j}$). After processing by the receiver modules 12, 22, the digital signals D1, D2 are each processed by the fast-time (range) FFT module 32 and slow-time (Doppler) FFT module 33, thereby generating the range-Doppler map (RDM). Because the eavesdropped signal is strong, it is easily identifiable from target returns in the range-Doppler map.

By premeasuring the propagation delays of the eavesdropping channels (e.g., at factory installation or during system integration and testing), the range position of the (strongest) eavesdropping peak can be found easily. As described more fully hereinbelow, the frequency/phase measurement module 37 may be configured to use the Doppler and peak amplitude phase information of the (strongest) eavesdropping peak to derive the frequency offset $\Delta f_0$ and phase offset $\Delta \varphi$ between the transmitting radar 10 and the eavesdropping radar 20, respectively. If eavesdropping signals from multiple receivers are available, they can be coherently combined by compensating for the pre-measured phase differences between the receiving antennas of the eavesdropping propagation channels and then vectorially summed. This is equivalent to forming a directional receiving beam in the direction of the transmitting antenna (e.g., $TX_{1,1}$). Alternatively, a receiver channel at the slave radar device 20 may be dedicated for eavesdropping on the transmission of the master radar device 10 by connecting the receiver channel to a directional antenna pointing at the master radar device 10. This may be needed if the propagation environment dictates higher gain.

While any suitable sequence of processing steps may be used by the frequency/phase measurement module 37 to measure or compute the frequency offset $\Delta f_0$ and phase offset $\Delta \varphi$, an example derivation sequence is illustrated with reference to the distributed coherent radar system 100 wherein the transmitter module (e.g., 11) in the first radar device 10 is selected as the master radar to transmit with the transmit antenna $TX_{1,1}$, and where the eavesdropping radar receivers (e.g., $RX_{2,1}$, $RX_{2,2}$, $RX_{2,3}$, $RX_{2,4}$) in the second radar device 20 operate as slave radars. In this arrangement, the frequency offset ($f_1 - f_2$) between the slave and master radar may be denoted as $\Delta f_0$ (in Hz), the time offset ($t_1 - t_2$) may be denoted as $\Delta t_0$ (in seconds), and the phase offset ($\varphi_1 - \varphi_2$) between the radars may be denoted as $\Delta \varphi$ (in radians). With reference to the chirp generators 112, 132, the starting frequency of the linear-frequency modulation (LFM) chirp may be denoted as $f_0$ (in Hz), and the chirping rate may be denoted as $\dot{f}$ (in Hz/sec). Without loss of generality, it may be assumed that the initial phase and transmitting time are both zeros, and the amplitude is "one."

With this understanding, the received radar signal $y_{ms}(t)$ at the output of the mixer 141 of the slave radar's receiver 21 can be modeled as shown below:

Master's Chirp at Slave Rx:

$$x_m(t) = e^{j2\pi\left(\left(f_0 + \frac{1}{2}\dot{f}t\right)t\right)}$$

Slave's Own Chirp:

$$x_s(t) = e^{j\Delta\varphi} e^{j2\pi\left(\left(f_0 + \Delta f_0 + \frac{1}{2}(\dot{f}+\Delta\dot{f})(t+\Delta t_0)\right)(t+\Delta t_0)\right)}$$

Slave's Mixer output:

$$y_{ms}(t) = conj(x_m(t)) * x_s(t)$$

$$= e^{j\Delta\varphi} e^{j2\pi\left(\left(f_0+\Delta f_0+\frac{1}{2}(\dot{f}+\Delta\dot{f})(t+\Delta t_0)\right)(t+\Delta t_0) - \left(f_0+\frac{1}{2}\dot{f}t\right)t\right)}$$

$$= e^{j2\pi\left((\Delta f_0 + (\dot{f}+\Delta\dot{f})\Delta t_0)t + \frac{1}{2}\Delta\dot{f}t^2\right)}$$

$$e^{j2\pi\left((f_0+\Delta f_0)\Delta t_0 + \frac{1}{2}(\dot{f}+\Delta\dot{f})\Delta t_0^2 + \frac{\Delta\varphi}{2\pi}\right)}$$

The instantaneous frequency $f_{ms}(t)$ at the mixer's output can be obtained by taking the time derivative of the received signal at the mixer output $y_{ms}(t)$, as shown below.

Instantaneous Frequency at Mixer Output:

$$f_{ms}(t) = \frac{d}{dt}\left(\frac{\arg(y_{ms}(t))}{j2\pi}\right)$$

$$= \frac{d}{dt}\Bigg((\Delta f_0 + (\dot{f}+\Delta\dot{f})\Delta t_0)t + \frac{1}{2}\Delta\dot{f}t^2 + (f_0+\Delta f_0)\Delta t_0 +$$

$$\frac{1}{2}(\dot{f}+\Delta\dot{f})\Delta t_0^2 + \frac{\Delta\varphi}{2\pi}\Bigg)$$

$$= (\Delta f_0 + (\dot{f}+\Delta\dot{f})\Delta t_0) + \Delta\dot{f}t$$

As shown by the equation model $f_{ms}(t)$, the instantaneous frequency for $f_{ms}(t)$ varies linearly with time at a rate of $\Delta\dot{f}$. Knowing that the instantaneous frequency $f_{ms}(t)$ corresponds to the time delay of the signal and knowing that the rate of the instantaneous frequency $f_{ms}(t)$ corresponds to the Doppler shift, it is seen that the value "$\Delta\dot{f}$" is an observable quantity that can be directly derived from the Doppler position of the identified eavesdropped signal peak on the range-Doppler map (RDM) generated at the output of the slow-time (Doppler) FFT module 33. In FIG. 1, this is illustrated with the frequency/phase measurement module 37 receiving an input from the slow-time (Doppler) FFT module 33 which generates the range-Doppler map. To obtain a higher accuracy estimate, the slow-time (Doppler) FFT module 33 may perform oversampling (e.g., zero-padding the slow-time samples for FFT) of the received radar signal.

Based on the first observation—that the value "$\Delta\dot{f}$" can be directly derived from the Doppler position of the identified eavesdropped signal peak on the range-Doppler map (RDM)—it is seen that the equation for the instantaneous frequency model for $f_{ms}(t)=(\Delta f_0+(\dot{f}+\Delta\dot{f})\Delta t_0)+\Delta\dot{f}t$ is an observable quantity that can be estimated from fast-time FFT signal generated at the output of the fast-time (Range) FFT module 32. In particular, it corresponds to the range position of the eavesdropped signal's peak on the range-Doppler map (RDM) generated by the slow-time (Doppler) FFT module 33. In FIG. 1, this is illustrated with the frequency/phase measurement module 37 receiving an input from the slow-time (Doppler) FFT module 33 which generates the range-Doppler map. As will be appreciated, a higher accuracy estimate can be obtained by performing oversampling (e.g., zero-padding) at the fast-time (Range) FFT module 32. Since $\Delta t_0$ is a pre-measured known value, $\Delta\dot{f}$ is obtained from the Doppler position of the identified eavesdropped signal peak, and $\dot{f}$ is the known chirp rate, it can be seen that the value $\Delta f_0$ can be solved from the equation for the instantaneous frequency model for $f_{ms}(t)$.

Based on the derived equation for the mixer output model $y_{ms}(t)$, it is seen that the instantaneous frequency equation term $$(f_0 + \Delta f_0)\Delta t_0 + \frac{1}{2}(\dot{f} + \Delta\dot{f})\Delta t_0^2 + \frac{\Delta\varphi}{2\pi}$$

is an observable quantity which corresponds to the phase of the peak amplitude of the eavesdropped signal, and can be estimated by dividing the fast-time FFT's phase with $2\pi$. Given known and obtained values of $f_0$, $\Delta f_0$, $\Delta t_0$, and $\dot{f}$, and assuming further that $\Delta\dot{f}$ is negligible (in fact, the entire $\frac{1}{2}(\dot{f}+\Delta\dot{f})\Delta t_0^2$ is likely negligible), $\Delta f$ can therefore be solved.

To measure or compute the frequency offset measurements ($\Delta f_0$) and phase offset measurements ($\Delta\varphi$) between the distributed radars, the frequency/phase measurement module 37 is connected to receive the results of the processing steps 32-36 in the bi-static radar module 31, either in the form of the target tracks (TRACKS) generated by the target tracking module 36 or directly from the intermediate processing stages, such as the fast-time (range) FFT module 32 and/or the slow-time (Doppler) FFT module 33. With these inputs, the frequency/phase measurement module 37 is also configured with control code and data structures to represent the signal models for the mixer output signal $y_{ms}(t)$ and instantaneous mixer output frequency $f_{ms}(t)$ and to produce the frequency offset measurements ($\Delta f_0$) and phase offset measurements ($\Delta\varphi$) between the distributed radars. Applying the derived frequency and phase offset measurements as compensations to the slave measurements (or, alternatively, to the master measurements), the radar controller processor 30 effectively compensates for differences and the radars' signals so that they may be processed in a coherent fashion as if the two radars are a single coherent radar.

Bi-Static MIMO Virtual Array Aperture with Alternating Master Radars

As indicated above, selected embodiments of the present disclosure provide a method and apparatus for constructing a bi-static multiple-input-multiple-output (MIMO) virtual array aperture from multiple, distributed smaller apertures by alternating the role of the master transmitting radar among radars, thereby providing virtual array aperture that is larger than the combined physical size of the distributed, smaller apertures for greatly improved angular resolution performance. In the depicted distributed coherent radar system 100), this is illustrated with the example of a radar controller processor 30 where the MIMO virtual array module 38 coordinates the coherent operation of two distributed radar devices 10, 20 by alternating the role of the master radar between them.

As an initial step, the first radar device 10 is selected as the master unit which implements a time-division MIMO process wherein a first transmit antenna ($TX_{1,1}$) is selected to transmit or radiate radar signals while the rest of the transmit antennas ($TX_{1,2}$, $TX_{1,3}$) are not radiating. Receiver antennas $RX_{1,1}$ to $RX_{1,4}$ of the selected master radar device 10 and receiver antennas $RX_{2,1}$ to $RX_{2,4}$ of the slave radar device 20 receive and process the mono-static and bi-static target returns, as shown. Subsequently, the second transmit antenna ($TX_{1,2}$) and third transmit antenna ($TX_{1,3}$) of the selected master radar device 10 are sequentially selected to transmit or radiate radar signals that are received and processed as target returns at the receiver antennas $RX_{1,1}$-$RX_{1,4}$ and $RX_{2,1}$-$RX_{2,4}$. Based on the target returns from the master radar device 10 received at the receiver antennas $RX_{1,1}$-$RX_{1,4}$ of the slave radar device 20, a first mono-static MIMO virtual array aperture may be formed. In addition, a second bi-static MIMO virtual array may be formed from the target returns from the master radar device 10 received at the receiver antennas $RX_{2,1}$-$RX_{2,4}$ of the slave radar device 20. Together, the mono-static MIMO aperture and bi-static MIMO aperture form a bi-static MIMO virtual aperture consisting of antenna element positions being the vectoral sum of the transmit antenna element position and the receiver antenna element position.

To provide additional details for an improved understanding of selected embodiments of the present disclosure, reference is now made to FIGS. 2A-C which provide simplified diagrammatic depictions of the physical radar apertures and resulting MIMO virtual array apertures which may be generated by distributed radar devices 201, 202 in accordance with selected embodiments of the present disclosure. In particular, FIG. 2A illustrates a distributed arrangement 200A of first and second radar devices 201, 202, each having three transmit antennas and three receiver antennas which are symmetrically positioned and distributed in relation to one another. In particular, the first distributed radar device 201 includes three physical transmit antennas $T_{1,1}$-$T_{1,3}$, with three physical receiver antennas $R_{1,1}$-$R_{1,3}$ positioned between the first and second physical transmit antennas $T_{1,1}$, $T_{1,2}$. In the depicted example of a mirrored arrangement, the second distributed radar device 202 includes three physical transmit antennas $T_{2,1}$-$T_{2,3}$, with three physical receiver antennas $R_{2,1}$-$R_{2,3}$ positioned between the second and third physical transmit antennas $T_{2,2}$, $T_{2,3}$. Without loss of generality, the physical antennas are shown as being positioned in a linear fashion, but may be arranged in non-linear fashion.

To illustrate an example virtual array aperture that may be formed with the distributed radar devices 201, 202 when the first radar device 201 is selected as the master radar, reference is now made to FIG. 2B which illustrates a first MIMO virtual array aperture 200B formed by transmitting radar signals from the three transmitting antennas $T_{1,1}$-$T_{1,3}$ of the first radar device 201 which are received at the receiving antennas $R_{1,1}$-$R_{1,3}$, $R_{2,1}$-$R_{2,3}$ from both radar devices 201, 202. On the left side, the mono-static MIMO virtual array elements 204 are generated by the receiving antennas $R_{1,1}$-$R_{1,3}$ on the master radar device 201 which receive radar transmit signals which are sequentially radiated by the three transmitting antennas $T_{1,1}$-$T_{1,3}$ of the master radar device 201. On the right side, the bi-static MIMO virtual array elements 205 are generated by the receiving antennas $R_{2,1}$-$R_{2,3}$ on the slave radar device 202 which receive radar transmit signals which are sequentially radiated by the three transmitting antennas $T_{1,1}$-$T_{1,3}$ of the master radar device 201. As a result, the first MIMO virtual array aperture 200B has more elements than the physical array 200A and occupies a larger (wider) area. Since angular resolution is inversely proportional to aperture size, the MIMO virtual array aperture 200B provides improved angular resolution (as compared to the physical array 200A). However, it is also seen that the first MIMO virtual array aperture 200B is a "sparse" array which contains holes or gaps between the virtual array elements.

In accordance with selected embodiments of the present disclosure, the size of the MIMO virtual array aperture may be increased further by also selecting the second radar device 202 to operate as the master unit so that the first radar device 201 operates as the slave unit. In this arrangement where the second radar device 202 is selected as the master unit and the first radar device 201 is selected as the slave unit, the three transmitting antennas $T_{2,1}$-$T_{2,3}$ of the second (master) radar device 202 are sequentially used to generate target returns at the receiving antennas $R_{1,1}$-$R_{1,3}$, $R_{2,1}$-$R_{2,3}$ from both radar devices 201, 202. Where there is no shared or common reference LO signal for the radar devices 201, 202, the ability to switch the "master unit" role between radar devices 201, 202 requires that the frequency and phase offset measurement values be obtained and applied to compensate the slave (or reversely to the master's) measurements and thereby enable coherent processing of the combined target returns from the radar devices 201, 202.

After using both radar devices 201, 202 as "master" units to transmit radar signals from all of the transmit antennas $T_{1,1}$-$T_{1,3}$, $T_{2,1}$-$T_{2,3}$, a second MIMO virtual array aperture 200C may be formed, as shown in FIG. 2C. As depicted, the second MIMO virtual array aperture 200C includes a first set of mono-static MIMO virtual array elements 206 generated by the receiving antennas $R_{1,1}$-$R_{1,3}$ when receiving sequentially transmitted radar transmit signals from the transmitting antennas $T_{1,1}$-$T_{1,3}$ of the (master-designated) first radar device 201. In addition, the second MIMO virtual array aperture 200C includes a second set of mono-static MIMO virtual array elements 208 generated by the receiving antennas $R_{2,1}$-$R_{2,3}$ when receiving sequentially transmitted radar transmit signals from the transmitting antennas $T_{2,1}$-$T_{2,3}$ of the (master-designated) second radar device 202. Finally, the second MIMO virtual array aperture 200C includes a third set of bi-static MIMO virtual array elements 207 generated by the receiving antennas $R_{1,1}$-$R_{1,3}$, $R_{2,1}$-$R_{2,3}$ when receiving sequentially transmitted radar transmit signals from the transmitting antennas $T_{1,1}$-$T_{1,3}$, $T_{2,1}$-$T_{2,3}$ of the radar device 201. As indicated with the grouping box 209, the third set of bi-static MIMO virtual array elements 207 includes redundant or overlapping contributions from the first and second radar devices when acting in their respective master unit roles. By virtue of alternating the master role amongst the distributed radar devices 201, 202, the second MIMO virtual array aperture 200C has more elements than the virtual array 200B and occupies a larger (wider) area since it is based on all six transmit antennas $T_{1,1}$-$T_{1,3}$, $T_{2,1}$-$T_{2,3}$ and receiver antennas $R_{1,1}$-$R_{1,3}$, $R_{2,1}$-$R_{2,3}$. As a result, the larger second MIMO virtual array aperture 200C provides improved angular resolution as compared to the first MIMO virtual array aperture 200B. However, it is also seen that the second MIMO virtual array aperture 200C is still a "sparse" array which contains holes or gaps between the virtual array elements, though the third set of bi-static MIMO virtual array elements 207 is the least-sparse contiguous array section.

While the second MIMO virtual array aperture 200C is described with reference to alternating the master radar role between two distributed radars 201, 202, it will be appreciated that the principle can be readily extended to additional radars. In addition, the benefits of alternating master radar transmissions can be extended to non-LFM (Linear Frequency Modulated) chirp radar, as well as to other forms of MIMO besides TD-MIMO.

Forward and Backward Difference Co-Array Processing

As indicated above, the distributed nature of the physical apertures to be combined (e.g., 201, 202) result in the formation of larger MIMO virtual array apertures (e.g., 200C) which are likely sparse (i.e., contains holes or gaps) and not entirely filled by virtual antenna elements by virtue of the Nyquist sampling requirements, and the resulting formed beams contain spurious side lobes because of under sampling and/or non-uniform sampling in the spatial domain. The presence of grating lobes, or spurious side lobes in general, increase the likelihood of false target detections in the angular domain.

To address these limitations and others known to those skilled in the art, selected embodiments of the present disclosure provide a signal processing apparatus, methodology and algorithm for constructing and accumulating mono-static, bi-static, and multi-static MIMO virtual array outputs and then performing forward and backward difference co-array processing and construction for cascaded physical and virtual array processing to mitigate or suppress spurious sidelobes in the formed radar beam pattern. In the depicted distributed coherent radar system 100, this is illustrated with the example of a radar controller processor 30 where the co-array processing module 39 constructs mono-static and bi-static MIMO virtual apertures, and then performs forward and backward difference co-array construction to mitigate the potential grating lobe or spurious lobe issue of sparse arrays. The generated co-array output may be further weighted with a windowing function to suppress the sidelobes in the formed beam pattern. In addition, the generated array beam pattern may be further weighted with the beam pattern formed by a contiguous or less-sparse section of the MIMO virtual aperture to further suppress the spurious lobes.

While any suitable sequence of processing steps may be used by the co-array processing module 39 to perform forward and backward difference co-array processing to mitigate the spurious sidelobes due to spatial under and non-uniform sampling, an example processing sequence is illustrated with reference to the MIMO virtual array aperture 200C which is further processed to generate the MIMO virtual array aperture 200D shown in FIG. 2D. In particular and as described more fully hereinbelow, the forward and backward difference co-array is first constructed and then the receive beam is formed based on the outputs of the constructed virtual array. For each range-Doppler cell to be processed, its antenna outputs across the formed MIMO array are further processed according to the following steps. Without loss of generality, linear array with equally spaced spatial samples are assumed.

With reference to the MIMO virtual array aperture 200C shown in FIG. 2C, the i-th MIMO virtual array antenna element's position may be denoted as $x_i=n_i*d$, where d is the unit element spacing in meters and $n_i$ is an integer. Ideally, d should be half wavelength for sampling the entire 180-degree field of view without ambiguity. In practice, the antenna's field of view is smaller than 180 degrees, so a larger spacing than half wavelength may be used.

The forward and backward difference co-array construction starts by constructing element pairs with respect to difference element-pair spacing. In an example where there are four antenna elements where $[x_1, x_2, x_3, x_4]=[1, 2, 3, 5]*d$, then the co-array virtual element is denoted $x_{i,j}=x_i-x_j$.

For construction of the forward difference co-array, all combinations resulting in zero or positive difference spacing are listed as the example below:

$x_{1,1}=0$
$x_{2,1}=d$
$x_{3,1}=2d$
$x_{4,1}=4d$
$x_{2,2}=0$
$x_{3,2}=d$
$x_{4,2}=3d$
$x_{3,3}=0$
$x_{4,3}=2d$
$x_{4,4}=0$

Upon grouping the antenna pair indices by non-negative difference spacing values, the following list is constructed:

| Difference Co-Array Element Spacing | Antenna Pair Indices |
|---|---|
| 0 | $x_{1,1}, x_{2,2}, x_{3,3}, x_{4,4}$ |
| d | $x_{2,1}, x_{3,2}$ |
| 2d | $x_{3,1}, x_{4,3}$ |
| 3d | $x_{4,2}$ |
| 4d | $x_{4,1}$ |

The pair-wise difference operation indicates that a difference co-array aperture of the size of five (5) elements can be constructed. The formed element outputs shall be calculated as follows.

First, the i-th MIMO antenna output is denoted as $y_i$, which is the k-th difference co-array element's output. Based on antenna pair indices $\{x_{i1,j1}, \ldots, x_{iM,jM}\}$, the k-th difference co-array element should be calculated as $$z_k = \frac{1}{M}\sum_{m=1}^{M} y_{im} y_{jm}^*.$$

The resulting forward difference co-array element output is provided below:

| Difference Co-Array Element Spacing | Antenna Pair Indices | Virtual element output |
|---|---|---|
| 0 | $x_{1,1}, x_{2,2}, x_{3,3}, x_{4,4}$ | $z_0 = \frac{1}{4}(y_1 y_1^* + y_2 y_2^* + y_3 y_3^* + y_4 y_4^*)$ |
| D | $x_{2,1}, x_{3,2}$ | $z_1 = \frac{1}{2}(y_2 y_1^* + y_3 y_2^*)$ |
| 2d | $x_{3,1}, x_{4,3}$ | $z_2 = \frac{1}{2}(y_3 y_1^* + y_4 y_3^*)$ |
| 3d | $x_{4,2}$ | $z_3 = y_4 y_2^*$ |
| 4d | $x_{4,1}$ | $z_4 = y_4 y_1^*$ |

As seen from above, the outputs $\{z_0, z_1, \ldots z_4\}$ are then used as the outputs corresponding to an antenna array with element positions (0, d, 2d, 3d, 4d). Angle processing, such as beamforming, can then be carried out.

In similar fashion, the backward difference co-array may be constructed by denoting $x_{i,j}=x_i-x_j$ for forward difference co-array, and then selecting all combinations resulting in non-positive difference spacing to calculate and the outputs based on the same principle. Continuing with the previous example, the pair indices and outputs of the elements of the backward difference co-array are identified as the following backward difference co-array element output table:

| Difference Co-Array Element Spacing | Antenna Pair Indices | Virtual element output |
|---|---|---|
| −4d | $x_{1,4}$ | $z_{-4} = y_1 y_4^* = z_4^*$ |
| −3d | $x_{2,4}$ | $z_{-3} = y_2 y_4^* = z_3^*$ |
| −2d | $x_{1,3}, x_{3,4}$ | $z_{-2} = \frac{1}{2}(y_1 y_3^* + y_3 y_4^*) = z_2^*$ |
| −d | $x_{1,2}, x_{2,3}$ | $z_{-1} = \frac{1}{2}(y_1 y_2^* + y_2 y_3^*) = z_1^*$ |
| 0 | $x_{1,1}, x_{2,2}, x_{3,3}, x_{4,4}$ | $z_0 = \frac{1}{4}(y_1 y_1^* + y_2 y_2^* + y_3 y_3^* + y_4 y_4^*)$ |

As seen from above, the virtual element output can be derived from the forward difference co-array outputs by taking the complex conjugate.

The final aperture is constructed based on the combined forward and backward difference co-arrays. In this example, a virtual array of nine (9) elements is formed with antenna positions $\{-4d, -3d, -2d, -d, 0, d, 2d, 3d, 4d\}$. Note that, if FFT is used for estimating target angles and there are any uniform linear array positions missing an output, zero filling should be performed to provide outputs for the missing array positions. Also note that, while conventional approaches for designing difference co-arrays (e.g., the minimum redundancy array (MRA) technique) seek to minimize the redundancy by maximizing the forward difference co-array without any holes, selected embodiments of the present disclosure seek to maintain some redundancy since the averaging effect between the overlapping contributions is helpful for reducing spurious sidelobes. In this way, a balance may be achieved between the design objectives of creating a large aperture and an evenly spread redundancy. In selected embodiments, every virtual antenna array element results from an equal number of averaging contributions.

To provide additional details for an improved understanding of selected embodiments of the present disclosure, reference is now made to FIGS. 2D-E which provide simplified diagrammatic depictions of different MIMO virtual array apertures 200D, 200E that may be generated by two distributed radar devices 201, 202 in accordance with selected embodiments of the present disclosure. In particular, FIG. 2D illustrates a third MIMO virtual array aperture 200D in which a forward difference co-array is formed on top of the third MIMO virtual array aperture 200C formed with mono-static and bi-static MIMO virtual arrays 206-208. With the third MIMO virtual array aperture 200D, the size of the aperture remains unchanged, but the aperture is fuller (e.g., fewer holes), resulting in lower spurious sidelobes. In FIG. 2E, a fourth MIMO virtual array aperture 200E in which a forward and backward difference co-array is formed on top of the mono-static and bi-static MIMO virtual arrays 206-208. With the fourth MIMO virtual array aperture 200E, the size of the aperture is almost doubled (as compared to the third MIMO virtual array aperture 200D) and the aperture is fuller, resulting in improved angular resolution and improved spurious side lobe performance.

While the difference co-array processing techniques disclosed hereinabove improve the angular resolution and reduce the spurious side lobes, there may be additional need for suppressing the spurious side lobes. To this end, the co-array processing module 39 may be configured to further reduce the spurious side lobes by spatially smoothing the forward/backward difference co-array element outputs in the forward direction. As will be appreciated, spatial smoothing is a technique used in array signal covariance matrix construction for the purpose of increasing the matrix rank as well as decorrelating coherent signals. As disclosed herein, spatial smoothing may be used for improving the arrival signal's progressive phase change measurement by averaging out error contributions. The co-array processing module 39 may be operatively configured to define a size of the spatially smoothed aperture size. If the smoothed aperture is of the same size as the original aperture size, no spatial smoothing is performed. However, if the smoothed aperture size is smaller, then a sliding-window averaging operation is taken to produce the averaged outputs. Note that the spatial smoothing requires a virtual array of equally spaced antenna elements. If the virtual array does not have equally spaced antenna elements, this method does not apply.

In addition or in the alternative, the co-array processing module 39 may be configured to further reduce the spurious side lobes by producing a composite beam forming output. To this end, the co-array processing module 39 may be configured to multiply the beam forming output of the forward/backward difference co-array (with or without spatial smoothing applied) with the beam forming output of a section of the MIMO virtual array. The selected MIMO virtual array section ideally should not be under-sampled (e.g., a section that forms a uniform linear array). In lieu of a filled section of array, a section that is least sparse (i.e., a few holes allowed) should be selected (e.g., section 207 indicated in FIG. 2C). By doing so, the spurious sidelobes in the output of the difference co-array process are greatly suppressed.

Figure 3:
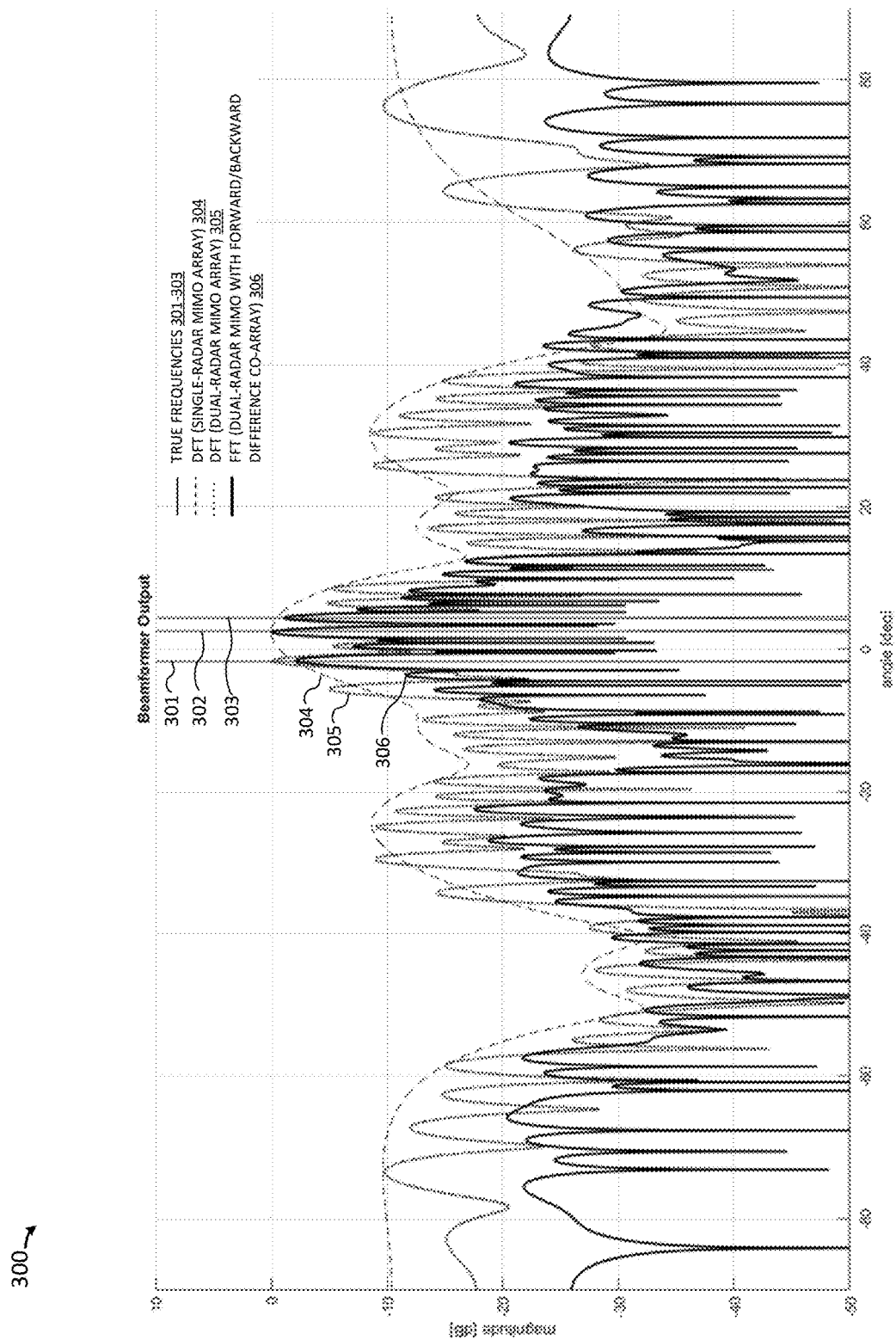
FIG. 3 depicts simulation normalized spatial frequency or angle spectrum of beamformer output results for three types of array processing examples in accordance with selected embodiments of the present disclosure.
Figure 4:
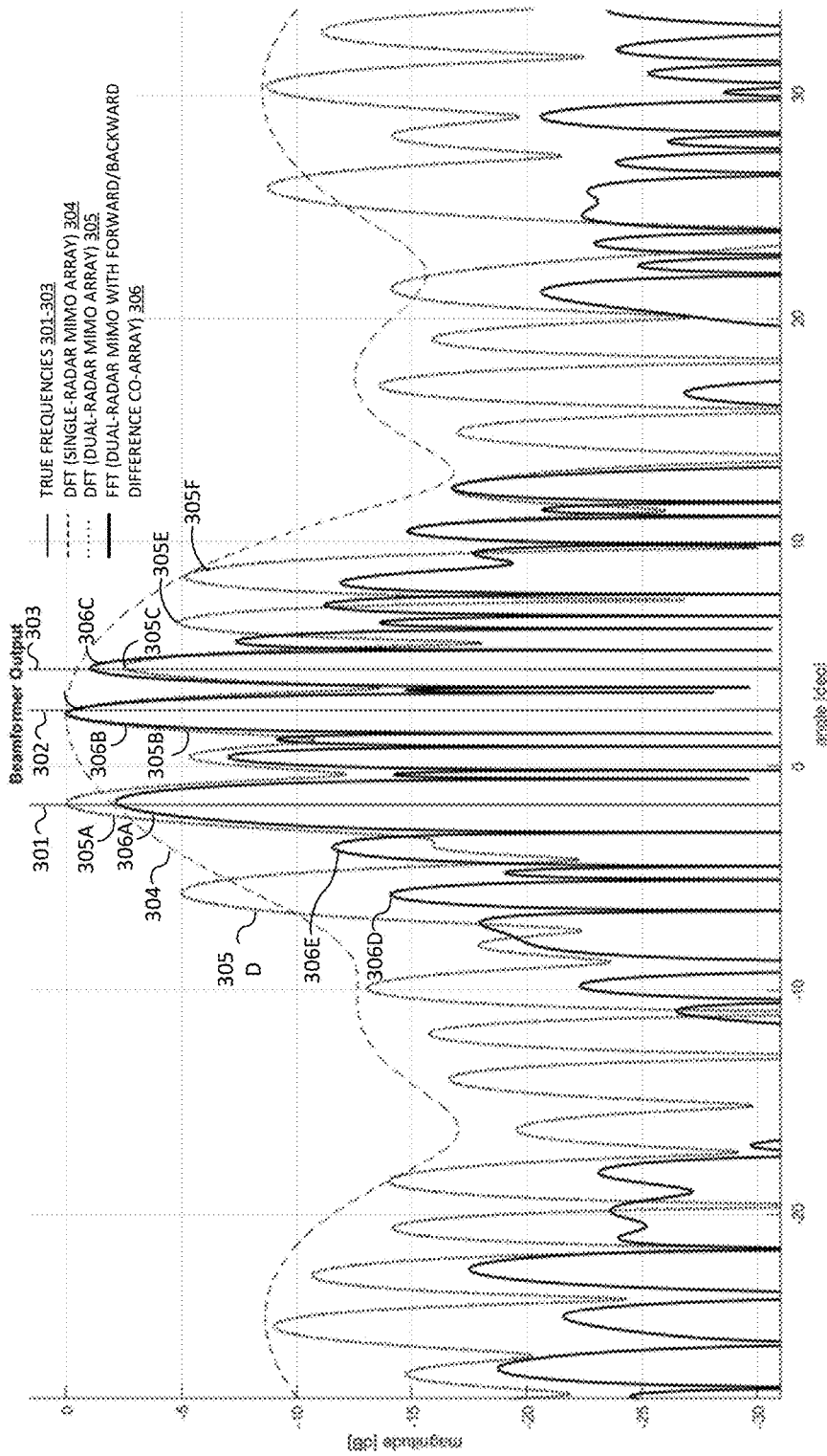
FIG. 4 depicts an enlarged view of the simulation angle spectrum shown in FIG. 3.

To illustrate the improved side lobe suppression benefits of the different array processing techniques disclosed herein, reference is now made to FIGS. 3-4 which depict a first view (FIG. 3) and enlarged view (FIG. 4) of simulation of normalized spatial frequency or angle spectrum (hereinafter, angle spectrum) of beamformer output results for three types of array processing examples for resolving three closely-spaced targets in accordance with selected embodiments of the present disclosure. In the simulation, the locations of the three targets is shown, respectively, with the true target angle or spatial frequencies (corresponding to target directions) 301-303. In addition, the beamforming angle spectrum 304 is generated using Discrete Fourier Transform (DFT) of a single radar MIMO array, such as the array output of the MIMO virtual array of a single radar aperture. An example single radar array would be the mono-static MIMO virtual array 204 of FIG. 2B.

With the angle spectrum 305, there is shown the beamforming output generated using DFT of the dual radar MIMO array output. In an example embodiment, the angle spectrum 305 is generated using DFT of the MIMO virtual array of two distributed radars that are combined by alternating the master role between radar devices, such as the bi-static MIMO virtual array 200C of FIG. 2C.

With the angle spectrum 306, there is shown the beamforming output generated using Fast Fourier Transform (FFT) of the dual radar MIMO array output with a forward-backward difference co-array. In an example embodiment, the angle spectrum 306 is generated using FFT of the virtual output of a MIMO Forward/Backward Difference Co-array of two distributed radars, such as the bi-static MIMO virtual array 200E of FIG. 2E.

The simulation angle spectrums 304-306 demonstrate the high angular resolution performance of the distributed aperture automotive radar systems and methodologies disclosed herein. With the angle spectrum 304 for a MIMO beamforming output of a single radar, the three targets cannot be resolved. This failure arises from the fact that the true target spatial frequencies 301-303 for the three targets are all contained in a single broad main central lobe instead of three distinct main lobes at the angle positions of the three targets.

In contrast, the angle spectrum 305 for a MIMO beamforming output of dual radars shows that the three targets can be resolved when two radars are combined in a coherent and alternating fashion when forming the MIMO aperture. This is seen in FIG. 4 where the angle spectrum 305 includes individual lobes 305A-C which, respectively, contain the true spatial frequencies 301-303 for the three targets. However, the angle spectrum 305 also includes large spurious side lobes 305D-F which result in a higher false target detection rate.

In the waveform 306 based on the forward and backward difference co-array virtual array output, the spurious side lobes are suppressed. This is seen in FIG. 4 where the angle spectrum 306 includes individual lobes 306A-C which, respectively, contain the true spatial frequencies 301-303 for the three targets, and also includes suppressed spurious side lobes (e.g., 306D-E).

As will be appreciated from the foregoing, without coherently combining the radars, distributed radar outputs can only be combined in a non-coherent fashion which results in no impact in the size of aperture and it only improves the SNR or sensitivity performance of the radar. However, coherent combination of the radars not only improves the angular resolution, but also improves the SNR performance. In addition, it is noted that the principle of forward/backward difference co-array virtual array processing can be applied to any physical or virtual arrays, and is not limited to MIMO virtual arrays.

Figure 5:
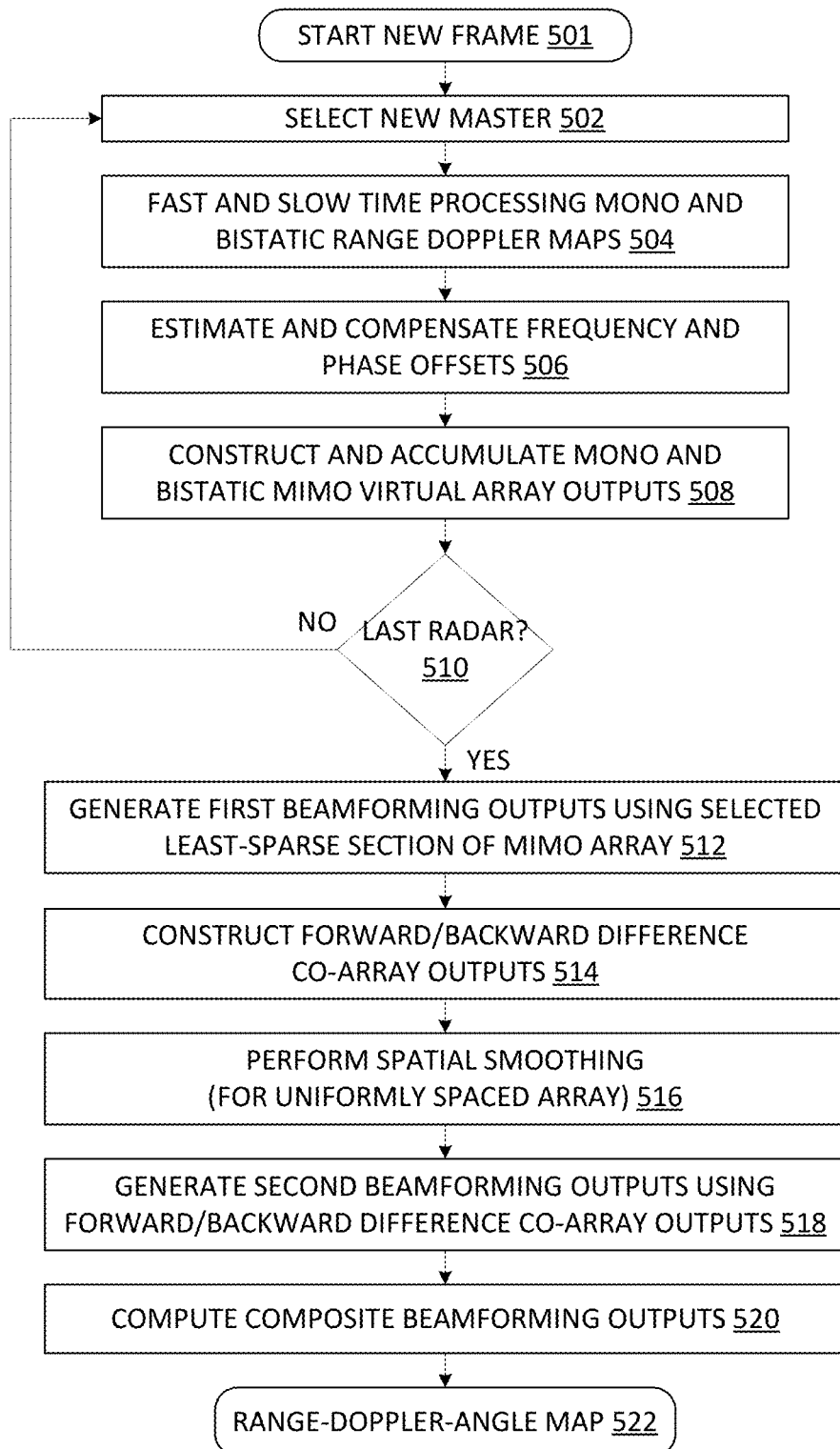
FIG. 5 illustrates a simplified flow chart showing the logic for combining multiple distributed small-aperture radars to form a virtually large coherent aperture in accordance with a first selected embodiment of the present disclosure.

To provide additional details for an improved understanding of selected embodiments of the present disclosure, reference is now made to FIG. 5 which depicts a simplified flow chart 500 showing the logic for combining multiple distributed small-aperture radars to form a virtually large coherent aperture. In an example embodiment, the control logic and methodology shown in FIG. 5 may be implemented as hardware and/or software on a host computing system, processor, or microcontroller unit that includes processor and memory for storing programming control code for constructing and operating a large virtual aperture radar by coherently combining distributed small aperture radars which do not share a common local oscillator signal.

The process starts (step 501), such as when a new radar frame is started. In radar systems, the transmitted radar signal may be periodically modulated, such as by applying a frequency and/or phase shift. The period is typically chosen such that the radar signal modulation occurs between two time frames of the signal, where a time frame may, for example, correspond with a "chirp" in an FMCW (frequency modulation continuous wave) signal.

At step 502, one of the distributed radars is selected or designated as the master unit, and any remaining distributed radar is selected or designated as a slave unit. The result of this selection is that, when the selected master-unit unit transmits on any transmit antenna, the other slave unit(s) turn off their transmit antennas and operate only in receiver mode. As the process iteratively repeats itself through steps 504-508 as described below, the processing at step 502 sequentially alternates the master unit role amongst the distributed radars by selecting a new master radar at each iteration until all of the radars have been selected to operate as the master unit. In each iteration, the selected master-unit radar may sequentially transmit radar waveforms from each transmit antenna on the master unit radar, and the target returns from master radar's transmitted waveforms are directionally received at the receiver antenna(s) of the master radar and also at the receiver antenna(s) of the designated slave-unit radar(s). To initiate operations at the distributed master and slave units, a trigger may be sent to all units to signal the start of a chirp.

At step 504, each slave-unit radar processes the master radar's transmitted waveforms by applying predetermined radar signal processing steps to the radar waveforms received at each slave unit's receiver antenna(s). While any suitable radar signal processing steps may be used, each slave-unit radar may be configured to perform the same fast-time and slow-time processing on the received radar signal in the same way it processes its own target returns range and Doppler processing steps for the radar waveforms received at each slave unit's receiver antenna(s). For example, the slave-unit radar may apply range and Doppler FFT processing to generate mono-static and bi-static range Doppler maps.

At step 506, each slave-unit radar (or the radar controller) calculates or estimates frequency and phase offset values, and then applies the offsets to compensate for frequency and phase differences between the master-unit radar and slave-unit radar. While any suitable estimation technique may be used to calculate the chirp starting frequency offset ($\Delta f_0$) and master-slave phase offset ($\Delta \varphi$), selected embodiments of the present disclosure configure each slave-unit radar may to estimate these values based on the differences between the estimated range and Doppler measurements with the known truth. More specifically, a signal processing algorithm is implemented with software instructions which are executed to directly derive the frequency offset ($\Delta f_0$) from the Doppler position of the identified eavesdropped signal peak on the range-Doppler map. In addition, the master-slave phase offset ($\Delta \varphi$) may be solved from the instantaneous frequency model:

$$f_{ms}(t) = \frac{d}{dt}\left((\Delta f_0 + (\dot{f} + \Delta \dot{f})\Delta t_0)t + \frac{1}{2}\Delta \dot{f} t^2 + (f_0 + \Delta f_0)\Delta t_0 + \frac{1}{2}(\dot{f} + \Delta \dot{f})\Delta t_0^2 + \frac{\Delta \varphi}{2\pi}\right),$$

based on the range-FFT estimated value off $f_{ms}(t)$ and the known or negligible values of $f_0$, $\Delta f_0$, $\Delta t_0$, $\dot{f}$, and $\Delta \dot{f}$. Once the frequency and phase offset values are derived for each slave-unit radar, the slave radars apply the estimated frequency and phase offsets to produce coherent target measurements. In this way, each slave-unit radar (or radar controller) processes the slave-received master signal data to estimate the slave unit's frequency and phase offsets to the master unit's, thereby allowing the slave-unit radar to generate coherent target data samples that are correlated in time, frequency, and phase with the master-unit radar.

At step 508, the correlated target return data samples received from the distributed radar devices are processed using bi-static radar principles to construct and accumulate mono-static and bi-static MIMO virtual array outputs by combining the distributed apertures, but without requiring physically mixing the received master-unit's transmissions with received target returns or sharing a local oscillator signal. In selected embodiments, the processing of correlated target return data samples generated by each master-unit is performed at the radar controller processor to generate a bi-static MIMO virtual array which includes a mono-static MIMO virtual array elements (e.g., 204) and bi-static MIMO virtual array elements (e.g., 205).

At step 510, the process determines if all of the distributed radars have been designated to operate as the master-unit radar. If not (negative outcome to detection step 510), then the process returns to step 502 to select another one of the distributed radars as the new master-unit, and step 504-510 are repeated until all radars have been selected as the master unit once. However, if the last radar has been selected as a master-unit (affirmative outcome to detection step 510), then the process may proceed to perform additional processing.

At step 512, the accumulated MIMO virtual array outputs generated at step 508 are processed to generate a first set of beamforming outputs that define an extended MIMO virtual aperture based on MIMO radar principles. In selected embodiments, the processing of MIMO virtual array outputs is performed at the radar controller processor to generate a first set of beamforming outputs using a selected least-sparse section of the MIMO virtual array.

At step 514, the MIMO array outputs are used to construct forward different co-array outputs, alone or in combination with backward difference co-array outputs. In selected embodiments, the forward difference co-array outputs are constructed by the radar controller processor which determines relative distance positions of the antenna elements in the MIMO array, identifies all combinations of antenna element pairs $x_i$, $x_j = x_i - x_j$ having a zero or positive difference spacing, and then calculates virtual forward co-array element outputs. If desired, angle processing, such as beamforming, can then be carried out based on the forward difference co-array construction, resulting in a bi-static MIMO forward difference virtual co-array aperture (e.g., 200D) that is the same size as, but less sparse than, the bi-static MIMO virtual array aperture (e.g., 200C). In addition, the radar controller processor may construct the backward difference co-array outputs by identifying all combinations of antenna element pairs $x_i$, $x_j = x_i - x_j$ having a zero or negative difference spacing and then calculating virtual backward co-array element outputs. If desired, angle processing can then be carried out based on the forward and backward difference co-array construction, resulting in a bi-static MIMO forward/backward difference virtual co-array aperture (e.g., 200E) that is larger than, and less sparse than, the bi-static MIMO virtual array aperture (e.g., 200C). In selected embodiments, the bi-static MIMO forward/backward difference virtual co-array aperture is almost twice as large as the bi-static MIMO virtual array aperture.

At step 516, additional processing is applied to suppress or reduce spurious side lobes by performing spatial smoothing on the forward/backward difference co-array outputs if the MIMO array is uniformly spaced. In selected embodiments, the radar controller processor may be configured to spatially smooth the forward/backward difference co-array element outputs in the forward direction. However, if the formed virtual array does not have equally spaced antenna elements, then step 516 is skipped.

At step 518, the (spatially smoothed) forward/backward difference co-array outputs are processed to generate a second set of beamforming outputs that define an extended MIMO virtual aperture based on MIMO radar principles. In selected embodiments, the processing of the forward/backward difference co-array outputs is performed at the radar controller processor. The size of the resulting aperture is almost doubled and the aperture is fuller, which results in improved angular resolution and improved spurious sidelobe performance.

At step 520, additional processing is applied to suppress or reduce spurious side lobes by computing composite beamforming outputs. In selected embodiments, the radar controller processor may be configured to produce a composite beam forming output by multiplying the beam forming output of the forward/backward difference co-array (with or without spatial smoothing applied) with the beam forming output of a section of the MIMO virtual array. By doing so, the spurious sidelobes in the output of the difference co-array process are greatly suppressed.

As will be appreciated by persons skilled in the art, the computed difference co-array output can be further processed using any super-resolution angle estimation algorithms, included but not limited to the beamforming algorithms based on Fourier analysis of the spatial frequency components of the co-array outputs, such as Discrete Fourier Transform or Fast Fourier Transform. Alternative super-resolution angle estimation algorithms include, but not limit to, Multiple Signal Classification (MUSIC) algorithm and its derivatives, Rotational Invariance (ESPRIT) algorithm and its derivatives, Matrix Pencil algorithm and its derivatives, Method of Direction Estimation (MODE) algorithm, Noise or Signal Subspace Fitting algorithm or its derivatives, Maximum Likelihood Estimator based algorithms, and Sparsity Constraint based or L1-Norm minimization based algorithms, among others.

In addition, it will be understood that the forward and backward difference co-array processing can be applied to a distributed radar system whose apertures are physically separated but share a common LO signal via a physical link. In this case, the eavesdropping processing steps are removed. In addition, the forward and backward difference co-array processing can be applied to a single radar system whose either physical antenna array or virtual MIMO array is sparse. In this case, the processing steps reduce to mono-static case and the need for making two distributed radar coherent is removed, as there is only a single coherent radar.

At step 522, the target map is generated to identify the range, Doppler, and angle values for each detected target. In selected embodiments, the radar controller processor may be configured to produce map data identifying paired range (r), Doppler ($\dot{r}$) and angle (θ) values for each detected/target object.

As disclosed herein, selected embodiments of the disclosed distributed aperture radar system may provide several enhancements when compared with conventional radar systems. In addition to enabling the construction of a single large coherent aperture from two or more distributed radars which achieves high angular resolution and suppresses spurious side lobes, the disclosed distributed aperture radar system can use RF front-end and signal processing blocks of existing radar designs without modifications, thereby minimizing the cost of developing the new solution. In addition, the distributed aperture radar system disclosed herein eliminates the requirement of physically sharing the LO signals at each radar device by providing an efficient mechanism for using estimated frequency and phase offset values to correlate the time, frequency and phase of distributed radar devices so that bi-static radar principles can be used to form a coherent aperture across a distance via eavesdropping the other radar's transmission. In addition, the present disclosure eliminates the need to perform cross-correlation or matched filtering since only specified mixing and fast-time and slow-time processing steps are required for estimating the frequency and phase offsets between radars. For systems that operate on independent, low cost oscillators, the ability to efficiently derive the frequency offset values is most helpful. In addition, when distributed radars are separated at a distance, the formed apertures are typically sparse in nature, resulting in spurious sidelobes, so the ability to mitigate or suppress the side lobes as disclosed herein enables larger separation between the radars without significantly increasing false detections.

By now it should be appreciated that there has been provided a distributed bi-static radar architecture, circuit, method, and system having first and second small aperture radar devices that are physically distributed from one another. In selected embodiments, the first and second small aperture radar devices each comprise a system-on-a-chip (SOC). In other embodiments, the first small aperture radar device includes a first local oscillator reference clock generator, and the second small aperture radar device includes a second, independent local oscillator reference clock generator. The first and second small aperture radar devices are connected to a radar control processing unit that is configured to alternately select the first and second small aperture radar devices to operate as the master unit so that radar signals are sequentially transmitted from every transmit antenna in the first and second plurality of transmit and receive antennas. The first small aperture radar device includes a first plurality of transmit and receive antennas coupled to a first signal processor component that is configured to transmit a first radar signal from at least a first transmit antenna and to process target returns from the first small aperture radar device to thereby generate a first mono-static virtual array aperture when the first small aperture radar device is selected to operate as a master unit, and that is configured to process target returns and an eavesdropped signal from the second small aperture radar device received at one or more receive antennas of the first small aperture radar device to generate a first bi-static virtual array aperture when the first small aperture radar device is selected to operate as a slave unit. In similar fashion, the second small aperture radar device includes a second plurality of transmit and receive antennas and a second signal processor component that is configured to transmit a second radar signal from at least a second transmit antenna and to process target returns from the second small aperture radar device to thereby generate a second mono-static virtual array aperture when the second small aperture radar device is selected to operate as a master unit, and that is configured to process target returns and an eavesdropped signal from the first small aperture radar device received at one or more receive antennas of the second small aperture radar device to generate a second bi-static virtual array aperture when the second small aperture radar device is selected to operate as a slave unit. The radar control processing unit is operable to produce target scene information by coherently combining virtual array apertures from the first and second small aperture radar devices to construct an extended bi-static MIMO virtual array aperture that is larger than the first or second bi-static MIMO virtual array apertures produced, respectively, by only the first small aperture radar device or second small aperture radar device. When operating as a slave unit, the second small aperture radar device is configured to process target returns and an eavesdropped signal from the first small aperture radar device when selected to operate as the master unit with fast and slow time processing steps; to compute an estimated frequency offset and an estimated phase offset between the first and second small aperture radar devices based on a range-doppler map derived from the fast and slow time processing steps; and to apply the estimated frequency offset and estimated phase offset to generate a bi-static virtual array aperture at the second small aperture radar device that is coherent in frequency and phase with the mono-static virtual array aperture generated by the first small aperture radar device selected to operate as the master unit. When operating as a slave unit, the second small aperture radar device computes the estimated frequency offset from the range-doppler map based on doppler and range positions of an identified eavesdropped signal peak in the range-doppler map. In addition or in the alternative, the (slave) second small aperture radar device may compute the estimated phase offset from the range-doppler map based on a detected phase of a peak amplitude of an identified eavesdropped signal peak in the range-doppler map. In addition or in the alternative, the second signal processor component in the (slave) second small aperture radar device may compute range fast Fourier transforms (FFTs) and doppler FFTs on target return signals received at the one or more receive antennas of the second small aperture radar device to generate the range-doppler map.

In another form, there is provided a method, system, and apparatus for operating a distributed aperture bi-static radar system comprising first and second small aperture radar devices that are physically distributed from one another and connected to a radar control processing unit. In selected embodiments, the first small aperture radar device includes a first local oscillator reference clock generator, and the second small aperture radar device includes a second, independent local oscillator reference clock generator. In the disclosed methodology, the radar control processing unit selects the first small aperture radar device to operate as a master unit and the second small aperture radar device to operate as a slave unit. Thereafter, the first (master) small aperture radar device sequentially transmits a first radar signal from every transmit antenna in a first plurality of transmit antennas at the first small aperture radar device. In addition, the first (master) small aperture radar device processes target returns received at one or more receive antennas of the first small aperture radar device in response to the first radar signal to generate a first mono-static virtual array aperture. In addition, the second (slave) small aperture radar device processes target returns and an eavesdropped signal from the first small aperture radar device received at one or more receive antennas of the second small aperture radar device in response to the first radar signal to generate a first bi-static virtual array aperture. Subsequently, the radar control processing unit selects the second small aperture radar device to operate as a master unit and the first small aperture radar device to operate as a slave unit. Thereafter the second (master) small aperture radar device sequentially transmits second radar signal from every transmit antenna in a second plurality of transmit antennas at the second small aperture radar device. In addition, the second (master) small aperture radar device processes target returns received at one or more receive antennas of the second small aperture radar device in response to the second radar signal to generate a second mono-static virtual array aperture. Finally, the radar control processing unit produces target scene information by coherently combining the first and second mono-static virtual array apertures and the first and second bi-static virtual array apertures from the first and second distributed radar devices to construct an extended bi-static MIMO virtual array aperture that is larger than the first or second bi-static MIMO virtual array apertures produced, respectively, by only the second small aperture radar device or first small aperture radar device. In operation when operating as a slave unit, the second small aperture radar device processes target returns and an eavesdropped signal from the first small aperture radar device when selected to operate as the master unit with fast and slow time processing steps; computes an estimated frequency offset and an estimated phase offset between the first and second small aperture radar devices based on a range-doppler map derived from the fast and slow time processing steps; and applies the estimated frequency offset and estimated phase offset to generate a bi-static virtual array aperture at the second small aperture radar device that is coherent in frequency and phase with the mono-static virtual array aperture generated by the first small aperture radar device selected to operate as the master unit. In such embodiments, the second (slave) small aperture radar device may compute the estimated frequency offset based on doppler and range positions of an identified eavesdropped signal peak in the range-doppler map. In addition or in the alternative, the second (slave) small aperture radar device may compute the estimated phase offset based on a detected phase of a peak amplitude of an identified eavesdropped signal peak in the range-doppler map. In addition or in the alternative, the second (slave) small aperture radar device may compute range fast Fourier transforms (FFTs) and doppler FFTs on target return signals received at the one or more receive antennas of the second small aperture radar device to generate the range-doppler map.

In yet another form, there is provided a distributed aperture bi-static radar system, method, and apparatus which includes a first and second multi-antenna radar devices that are physically distributed from one another and that may each be embodied as a system-on-a-chip (SOC). In particular, the first multi-antenna radar device includes a first plurality of transmit and receive antennas coupled to a first signal processor component. In addition, the second multi-antenna radar device includes a second plurality of transmit and receive antennas coupled to a second signal processor component. In selected embodiments, the first multi-antenna radar device includes a first local oscillator reference clock generator, and the second multi-antenna radar device includes a second, independent local oscillator reference clock generator. In the distributed aperture bi-static radar system, the first and second multi-antenna radar devices are coupled to a radar control processing unit that is configured to alternately select the first and second multi-antenna radar devices to operate as the master unit so that radar signals are sequentially transmitted from every transmit antenna in the first and second plurality of transmit and receive antennas. Thus connected, the first multi-antenna radar device is configured to transmit a first radar signal from at least a first transmit antenna and to process target returns from the first multi-antenna radar device to thereby generate a first mono-static virtual array aperture when the first multi-antenna radar device is selected to operate as a master unit, and that is configured to process target returns and an eavesdropped signal from the second multi-antenna radar device received at one or more receive antennas of the first multi-antenna radar device to generate a first bi-static virtual array aperture when the first multi-antenna radar device is selected to operate as a slave unit. In addition, the second multi-antenna radar device is configured to transmit a second radar signal from at least a second transmit antenna and to process target returns from the second multi-antenna radar device to thereby generate a second mono-static virtual array aperture when the second multi-antenna radar device is selected to operate as a master unit, and that is configured to process target returns and an eavesdropped signal from the first multi-antenna radar device received at one or more receive antennas of the second multi-antenna radar device to generate a second bi-static virtual array aperture when the second multi-antenna radar device is selected to operate as a slave unit. When operating as a slave unit, the second multi-antenna device may be configured to process target returns and an eavesdropped signal from the first multi-antenna radar device when selected to operate as the master unit with fast and slow time processing steps, to compute an estimated frequency offset and an estimated phase offset between the first and second multi-antenna radar devices based on a range-doppler map derived from the fast and slow time processing steps, and to apply the estimated frequency offset and estimated phase offset to generate a bi-static virtual array aperture at the second multi-antenna radar device that is coherent in frequency and phase with the mono-static virtual array aperture generated by the first multi-antenna radar device selected to operate as the master unit. In such embodiments, the second (slave) multi-antenna radar device may compute the estimated frequency offset based on doppler and range positions of an identified eavesdropped signal peak in the range-doppler map. In addition or in the alternative, the second (slave) multi-antenna radar device may compute the estimated phase offset based on a detected phase of a peak amplitude of an identified eavesdropped signal peak in the range-doppler map. In addition or in the alternative, the second (slave) multi-antenna radar device may compute range fast Fourier transforms (FFTs) and doppler FFTs on target return signals received at the one or more receive antennas of the second small aperture radar device to generate the range-doppler map. With this arrangement, the radar control processing unit is configured to produce target scene information by coherently combining virtual array apertures from the first and second distributed radar devices to construct an extended bi-static MIMO virtual array aperture that is larger than the first or second bi-static MIMO virtual array apertures produced, respectively, by only the first distributed radar device or second distributed radar device.

Although the described exemplary embodiments disclosed herein focus on example automotive radar circuits, systems, and methods for using same, the present invention is not necessarily limited to the example embodiments illustrate herein. For example, various embodiments of a distributed aperture radar may be applied in non-automotive applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A distributed aperture bi-static radar system comprising first and second small aperture radar devices that are physically distributed from one another and connected to a radar control processing unit, the first small aperture radar device comprising a first plurality of transmit and receive antennas coupled to a first signal processor component that is configured to transmit a first radar signal from at least a first transmit antenna and to process target returns from the first small aperture radar device to thereby generate a first mono-static virtual array aperture when the first small aperture radar device is selected to operate as a master unit, and that is configured to process target returns and an eavesdropped signal from the second small aperture radar device received at one or more receive antennas of the first small aperture radar device to generate a first bi-static virtual array aperture when the first small aperture radar device is selected to operate as a slave unit;

the second small aperture radar device that is physically distributed from the first small aperture radar device comprising a second plurality of transmit and receive antennas and a second signal processor component that is configured to transmit a second radar signal from at least a second transmit antenna and to process target returns from the second small aperture radar device to thereby generate a second mono-static virtual array aperture when the second small aperture radar device is selected to operate as a master unit, and that is configured to process target returns and an eavesdropped signal from the first small aperture radar device received at one or more receive antennas of the second small aperture radar device to generate a second bistatic virtual array aperture when the second small aperture radar device is selected to operate as a slave unit; and the radar control processing unit configured to alternately select the first and second small aperture devices to operate as the master unit so that radar signals are sequentially transmitted from every transmit antenna in the first and second plurality of transmit and receive antennas, the radar control processing unit operable to produce target scene information by coherently combining virtual array apertures from the first and second small aperture radar devices to construct an extended bi-static MIMO virtual array aperture that is larger than the first or second bi-static MIMO virtual array apertures produced, respectively, by only the first small aperture radar device or second small aperture radar device.

2. The distributed aperture radar system of claim 1, where the first and second small aperture radar devices each comprise a system-on-a-chip (SOC).

3. The distributed aperture radar system of claim 1, where the first small aperture radar device comprises a first local oscillator reference clock generator, and where the second small aperture radar device comprises a second, independent local oscillator reference clock generator.

4. The distributed aperture radar system of claim 1, where the second small aperture radar device, when operating as a slave unit, is configured to:
  process target returns and an eavesdropped signal from the first small aperture radar device when selected to operate as the master unit with fast and slow time processing steps,
  compute an estimated frequency offset and an estimated phase offset between the first and second small aperture radar devices based on a range-doppler map derived from the fast and slow time processing steps, and
  apply the estimated frequency offset and estimated phase offset to generate a bi-static virtual array aperture at the second small aperture radar device that is coherent in frequency and phase with the mono-static virtual array aperture generated by the first small aperture radar device selected to operate as the master unit.

5. The distributed aperture radar system of claim 4, where the second small aperture radar device computes the estimated frequency offset from the range-doppler map based on doppler and range positions of an identified eavesdropped signal peak in the range-doppler map.

6. The distributed aperture radar system of claim 4, where the second small aperture radar device computes the estimated phase offset from the range-doppler map based on a detected phase of a peak amplitude of an identified eavesdropped signal peak in the range-doppler map.

7. The distributed aperture radar system of claim 4, where the second signal processor component computes range fast Fourier transforms (FFTs) and doppler FFTs on target return signals received at the one or more receive antennas of the second small aperture radar device to generate the range-doppler map.

8. A method for operating a distributed aperture bi-static radar system comprising first and second small aperture radar devices that are physically distributed from one another and connected to a radar control processing unit, comprising:
  selecting, by radar control processing unit, the first small aperture radar device to operate as a master unit and the second small aperture radar device to operate as a slave unit;
  sequentially transmitting a first radar signal from every transmit antenna in a first plurality of transmit antennas at the first small aperture radar device;
  processing, at the first small aperture radar device, target returns received at one or more receive antennas of the first small aperture radar device in response to the first radar signal to generate a first mono-static virtual array aperture;
  processing, at the second small aperture radar device, target returns and an eavesdropped signal from the first small aperture radar device received at one or more receive antennas of the second small aperture radar device in response to the first radar signal to generate a first bi-static virtual array aperture; then
  selecting, by radar control processing unit, the second small aperture radar device to operate as a master unit and the first small aperture radar device to operate as a slave unit;
  sequentially transmitting a second radar signal from every transmit antenna in a second plurality of transmit antennas at the second small aperture radar device;
  processing, at the second small aperture radar device, target returns received at one or more receive antennas of the second small aperture radar device in response to the second radar signal to generate a second mono-static virtual array aperture; and then
  producing target scene information at the radar control processing unit by coherently combining the first and second mono-static virtual array apertures and the first and second bi-static virtual array apertures from the first and second distributed radar devices to construct an extended bi-static MIMO virtual array aperture that is larger than the first or second bi-static MIMO virtual array apertures produced, respectively, by only the second small aperture radar device or first small aperture radar device.

9. The method of claim 8, where the first small aperture radar device comprises a first local oscillator reference clock generator, and where the second small aperture radar device comprises a second, independent local oscillator reference clock generator.

10. The method of claim 8, where the second small aperture radar device, when operating as a slave unit:
  processes target returns and an eavesdropped signal from the first small aperture radar device when selected to operate as the master unit with fast and slow time processing steps;
  computes an estimated frequency offset and an estimated phase offset between the first and second small aperture radar devices based on a range-doppler map derived from the fast and slow time processing steps; and
  applies the estimated frequency offset and estimated phase offset to generate a bi-static virtual array aperture at the second small aperture radar device that is coherent in frequency and phase with the mono-static virtual array aperture generated by the first small aperture radar device selected to operate as the master unit.

11. The method of claim 10, where the second small aperture radar device computes the estimated frequency offset based on doppler and range positions of an identified eavesdropped signal peak in the range-doppler map.

12. The method of claim 10, where the second small aperture radar device computes the estimated phase offset based on a detected phase of a peak amplitude of an identified eavesdropped signal peak in the range-doppler map.

13. The method of claim 10, where a second signal processor component in the second small aperture radar device computes range fast Fourier transforms (FFTs) and doppler FFTs on target return signals received at the one or more receive antennas of the second small aperture radar device to generate the range-doppler map.

14. A distributed aperture bi-static radar system, comprising:
- a first multi-antenna radar device comprising a first plurality of transmit and receive antennas coupled to a first signal processor component;
- a second multi-antenna radar device that is physically distributed from the first multi-antenna radar device and that comprises a second plurality of transmit and receive antennas coupled to a second signal processor component; and
- a radar control processing unit configured to alternately select the first and second multi-antenna radar devices to operate as the master unit so that radar signals are sequentially transmitted from every transmit antenna in the first and second plurality of transmit and receive antennas,
- wherein the first multi-antenna radar device is configured to transmit a first radar signal from at least a first transmit antenna and to process target returns from the first multi-antenna radar device to thereby generate a first mono-static virtual array aperture when the first multi-antenna radar device is selected to operate as a master unit, and that is configured to process target returns and an eavesdropped signal from the second multi-antenna radar device received at one or more receive antennas of the first multi-antenna radar device to generate a first bi-static virtual array aperture when the first multi-antenna radar device is selected to operate as a slave unit,
- wherein the second multi-antenna radar device is configured to transmit a second radar signal from at least a second transmit antenna and to process target returns from the second multi-antenna radar device to thereby generate a second mono-static virtual array aperture when the second multi-antenna radar device is selected to operate as a master unit, and that is configured to process target returns and an eavesdropped signal from the first multi-antenna radar device received at one or more receive antennas of the second multi-antenna radar device to generate a second bi-static virtual array aperture when the second multi-antenna radar device is selected to operate as a slave unit, and
- wherein the radar control processing unit is configured to produce target scene information by coherently combining virtual array apertures from the first and second distributed radar devices to construct an extended bi-static MIMO virtual array aperture that is larger than the first or second bi-static MIMO virtual array apertures produced, respectively, by only the first distributed radar device or second distributed radar device.

15. The distributed aperture bi-static radar system of claim 14, where the first and second multi-antenna radar devices each comprise a system-on-a-chip (SOC).

16. The distributed aperture bi-static radar system of claim 14, where the first multi-antenna radar device comprises a first local oscillator reference clock generator, and where the second multi-antenna radar device comprises a second, independent local oscillator reference clock generator.

17. The distributed aperture bi-static radar system of claim 14, where the second multi-antenna device, when operating as a slave unit, is configured to:
- process target returns and an eavesdropped signal from the first multi-antenna radar device when selected to operate as the master unit with fast and slow time processing steps,
- compute an estimated frequency offset and an estimated phase offset between the first and second multi-antenna radar devices based on a range-doppler map derived from the fast and slow time processing steps, and
- apply the estimated frequency offset and estimated phase offset to generate a bi-static virtual array aperture at the second multi-antenna radar device that is coherent in frequency and phase with the mono-static virtual array aperture generated by the first multi-antenna radar device selected to operate as the master unit.

18. The distributed aperture bi-static radar system of claim 17, where the second multi-antenna radar device computes the estimated frequency offset based on doppler and range positions of an identified eavesdropped signal peak in the range-doppler map.

19. The distributed aperture bi-static radar system of claim 17, where the second multi-antenna radar device computes the estimated phase offset based on a detected phase of a peak amplitude of an identified eavesdropped signal peak in the range-doppler map.

20. The distributed aperture bi-static radar system of claim 18, where the second multi-antenna radar device computes range fast Fourier transforms (FFTs) and doppler FFTs on target return signals received at the one or more receive antennas of the second small aperture radar device to generate the range-doppler map.

* * * * *